United States Patent Office 3,634,542
Patented Jan. 11, 1972

3,634,542
UNSATURATED POLYESTERS ESTERIFIED WITH POLYCARBOXYLIC ACID ANHYDRIDE AND CONTAINING POLYEPOXIDE
Robert T. Dowd, Wichita Falls, Tex., and Thomas D. Clark, Mission Viejo, Calif., assignors to Shell Oil Company, New York, N.Y.
No Drawing. Filed Aug. 4, 1969, Ser. No. 847,435
Int. Cl. C08g 45/04
U.S. Cl. 260—837 R
7 Claims

ABSTRACT OF THE DISCLOSURE

New, curable polyester compositions having controlled viscosity, which eliminate or reduce surface tack and which impart improved chemical resistance to glass reinforced structures are disclosed. These compositions comprise a mixture of (1) a partial half ester of (a) a hydroxy-substituted ethylenically unsaturated polyester reaction product of a polyepoxide and an ethylenically unsaturated organic carboxylic acid and (b) a polycarboxylic acid anhydride and (2) a dissimilar polymeric material possessing a plurality of epoxy groups. Also disclosed are the above-defined compositions containing a copolymerizable ethylenically unsaturated monomer, such as styrene.

BACKGROUND OF THE INVENTION

Cured polyepoxides have many desirable properties such as solvent and chemical resistance and good adhesion to metal and there has been an increasing desire to transfer many of these desirable properties over to the conventional polyester type products. This can be accomplished by reacting the polyepoxides with an unsaturated monocarboxylic acid, such as, for example, methacrylic acid. The products prepared in this manner can be cured in the presence of peroxide catalysts to form products having the desired characteristics of the polyepoxides as well as those of the unsaturated polyesters.

It is therefore known that products having properties of both polyepoxides and unsaturated polyesters can be obtained by reacting the polyepoxides with unsaturated acids, such as methacrylic acid. A valuable product of this type, for example, can be obtained by reacting a glycidyl polyether of 2,2-bis(4-hydroxyphenyl)propane with methacrylic acid. Such a product can be represented by the following formula:

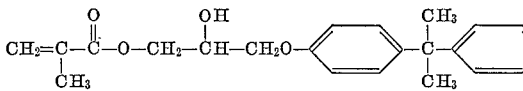 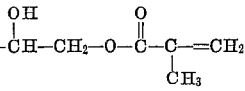

The hydroxy-substituted unsaturated polyesters of this type, however, have certain undesirable properties which have limited their use in industry. For example, products obtained from these polyesters fail to have the chemical resistance desired for many applications. In addition, the products prepared from these polymers fail to have the desired retention of impact values needed for many important uses. Finally, the polyesters themselves and their styrene solutions exhibit rather poor storage stability. The polyesters could also stand improvement in heat distortion values. These deficiencies limit the use of the polyesters in certain applications, such as filament winding and the like, where good stability and heat resistance are important.

It is also known that these polyesters have relatively low viscosities which tend to limit their use still further. It was found that the viscosity could be controlled by the addition of certain vinyl acetate polymers. Although this modification allows the control of the viscosity to a greater extent, there is still the need to increase the viscosity, to improve the impact strength, and to improve the chemical resistance of these polyesters.

It was discovered that many of these shortcomings are eliminated by modifying the above-mentioned epoxy-acrylate polyesters. Thus, improved compositions comprised the half esters (or partial half esters) of (1) hydroxy-substituted ethylenically unsaturated polyesters obtained by reacting a polyepoxide, and preferably a glycidyl polyether of a polyhydric phenol, with an ethylenically unsaturated monocarboxylic acid, such as methacrylic acid, and (2) a polycarboxylic acid anhydride such as, for example, maleic anhydride. These half esters are preferably prepared by mixing and reacting a hydroxy-substituted unsaturated polyester defined as above with controlled amounts of the polycarboxylic acid anhydride, or alternatively by reacting a polyepoxide with the unsaturated monocarboxylic acid and when the reaction is substantially complete adding the acid anhydride and containing the reaction until the anhydride is reacted.

While these modified polyesters exhibit excellent storage stability compared to the unmodified polyester, they still do not have the desired degree of chemical resistance, particularly resistance to NaOH when employed in glass reinforced laminates. Also, the surface tack of coatings is undesirable for some applications.

SUMMARY OF THE INVENTION

A curable composition which exhibits reduced surface tack, improved impact resistance and which imparts improved chemical resistance to glass laminates comprises (1) a half ester, or partial half ester, of (a) a hydroxy-substituted ethylenically unsaturated polyester reaction product of a polyepoxide containing more than one vic-epoxy group and an ethylenically unsaturated carboxylic acid and (b) a polycarboxylic acid anhydride and (2) a glycidyl polyether of a polyhydric phenol or a polyhydric alcohol and, optionally, an unsaturated monomer such as styrene.

Surprisingly, it has been found that these new compositions can be prepared with a variety of viscosities by controlling the amount of the additive glycidyl polyether added to the mixture. By thus controlling the properties one is able to obtain products having a wide range of viscosities which can be used for a great variety of different applications. It has further been found that the presence of this polyether additive imparts unexpected improvement in the properties of the cured products, such as reduced surface tack and improved chemical resistance, hardness and distensibility.

DESCRIPTION OF THE PREFERRED EMBODIMENT

It has been found that the above-described improvements in physical properties are obtained by curable compositions comprising (1) 100 parts by weight of a half ester, or partial half ester, of (a) a hydroxy-substituted ethylenically unsaturated polyester reaction product of a polyepoxide containing more than one vicinal epoxy group and an ethylenically unsaturated carboxylic acid and (b) a polycarboxylic acid anhydride and (2) from 0.1 to 50 parts by weight (preferably about 1 to 30 parts) of a glycidyl polyether of a polyhydric phenol or a polyhydric alcohol, and preferably a glycidyl or polyether of 2,2-bis(4-hydroxyphenyl)propane and, optionally, (3) from about 1 to about 200 parts by weight of an unsaturated monomer such as styrene, and preferably from about 20 to 150 parts by weight.

The half esters which are suitable for use in the present invention are simply prepared by mixing and reacting (a) a hydroxy-substituted unsaturated polyester having the general formula:

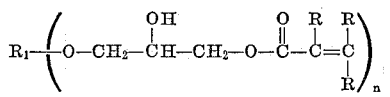

wherein $R_1$ is an aromatic radical, R is hydrogen or alkyl and $n$ is an integer of at least 2, and preferably 2 to 6, with controlled amounts of (b) of polycarboxylic acid anhydride, or alternatively, by reacting a polyepoxide with the unsaturated monocarboxylic acid and when the reaction is substantially complete, adding the acid anhydride and continuing the reaction until the anhydride is reacted.

The polyepoxides used in preparing these hydroxy-substituted unsaturated polyesters comprise those compounds possessing more than one vic-epoxy group, i.e., more than

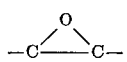

group. These polyepoxides may be saturated or unsaturated, aliphatic, cycloaliphatic, aromatic or heterocyclic and may be substituted if desired with non-interfering substituents, such as halogen atoms, phosphorous atoms, hydroxyl groups, ether radicals, and the like. They may also be monomeric or polymeric.

For clarity, many if the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the glycidyl ethers of novolac resins, i.e., phenol-aldehyde condensates. Preferred resins of this type are those of the formula:

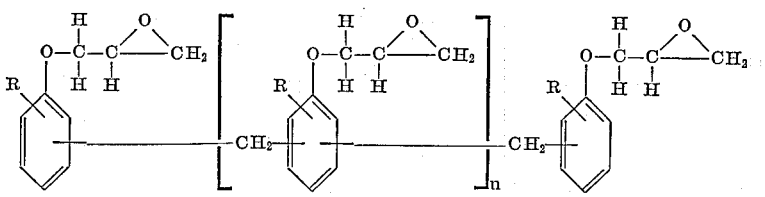

wherein R is hydrogen or an alkyl radical and $n$ is an integer of 1 to about 10. Preparation of these polyepoxides is illustrated in U.S. 2,216,099 and U.S. 2,658,885.

Other examples include the epoxidized esters of the polyethylenically unsaturated monocarboxylic acids, such as epoxidized linseed, soybean, perilla oiticica, tung, walnut and dehydrated castor oil, methyl linoleate, butyl linoleate, ethyl 9,12-octadecandienoate, butyl 9,12,15-octadecatrienoate, butyl 9,12,15-octadecatrienoate, butyl eleoestearate, mono or diglycerides of tung oil, fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, diglycidyl phthalate,
diglycidyl adipate,
diglycidyl isophthalate,
di(2,3-epoxybutyl)adipate,
di(2,3-epoxybutyl)oxalate,
di(2,3-epoxyhexyl)succinate,
di(3,4-epoxybutyl)maleate,
di(2,3-epoxyoctyl)pimelate,
di(2,3-epoxybutyl)phthalate,
di(2,3-epoxyoctyl)tetrahydrophthalate,
di(4,5-epoxydodecyl)maleate,
di(2,3-epoxybutyl)terephthalate,
di(2,3-epoxypentyl)thiodipropionate,
di(5,6-epoxytetradecyl)diphenyldicarboxylate,
di(3,4-epoxyheptyl)sulfonyldibutyrate,
tri(2,3-epoxybutyl)1,2,4-butanetricarboxylate,
di(5,6-epoxypentadecyl)tartarate,
di(4,5-epoxytetradecyl)maleate,
di(2,3-epoxybutyl)azelate,
di(3,4-epoxybutyl)citrate,
di(5,6-epoxyoctyl)cyclohexane-1,3-dicarboxylate,
di(4,5-epoxyoctadecyl)malonate.

Another group of the epoxy-containing materials include those epoxidized esters of unsaturated alcohols and unsaturated carboxylic acids, such as glycidyl glycidate, 2,3-epoxybutyl 3,4-epoxypentanoate; 3,4-epoxyhexyl, 3,4-epoxypentanoate; 3,4-epoxycyclohexyl 3,4-epoxycyclohexyl methyl epoxycyclohexane carboxylate.

Still another group of the epoxy-containing materials include epoxidized derivatives of polyethylenically unsaturated polycarboxylic acids, such as, for example, dimethyl 8,9,12,13-diepoxyeicosanedioate; dibutyl 7,8,11,12-diepoxyoctadecanedioate; dioctyl 10,11-diethyl-8,9,12,13-diepoxyeicosanedioate; dihexyl 6,7,10,11-diepoxyhexadecanedioate; didecyl 9-epoxyethyl-10,11 - epoxyoctadecanedioate; dibutyl 3-butyl-3,4,5,6-diepoxycyclohexane - 1,2-dicarboxylate; dicyclohexyl 3,4,5,6 - diepoxycyclohexane-1,2-dicarboxylate; dibenzyl 1,2,4,5-diepoxycyclohexane-1,2-dicarboxylate and diethyl 5,6,10,11-diepoxyoctadecyl succinate.

Still another group comprises the epoxidized polyester obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexane-1,4-dicarboxylic acid and the like, and mixtures thereof.

Still another group comprises the epoxidized polyethylenically unsaturated hydrocarbons, such as epoxidized 2,2-bis(2-cyclohexenyl)propane epoxidized vinyl cyclohexane and epoxidized dimer of cyclopentadiene.

The other component in the reaction comprises an ethylenically unsaturated organic carboxylic acid which may be aliphatic, cycloaliphatic or aromatic. Examples of the acids to be utilized include acrylic acids, methacrylic acid, cyclohexene carboxylic acid, crotonic acid, alpha-phenylacrylic acid, alpha-cyclohexyl-acrylic acid, cyanoacrylic acid, methoxyacrylic acid, and the like.

Preferred catalysts to be utilized in the process comprise the onium salts, and preferably those containing phosphorus, sulfur or nitrogen, such as, for example, the phosphonium, sulfonium and ammonium salts of inorganic acids. Examples of these include, among others, benzyltrimethylammonium sulfate, tetramethylammonium chloride, benzyltrimethylammonium nitrate, diphenyldimethylammonium chloride, benzyltrimethylammonium chloride, diphenyldimethylammonium nitrate, diphenylmethylsulfonium chloride, tricyclohexylsulfonium bromide, triphenylmethylphosphonium iodide, diethyldibutylphosphonium nitrate, trimethylsulfonium chloride, dicyclohexyldinaylphosphonium iodide, benzyltrimethylammonium thiocyanate, and the like, and mixtures thereof.

Preferred onium salts to be employed include those of the formula:

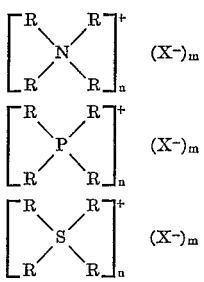

wherein R is a hydrocarbon radical, and preferably an aryl, alkyl, alkenyl, cycloalkyl, cycloalkenyl or alkaryl radical containing up to 12 carbon atoms, X is an ion of an inorganic acid, and particularly a halogen atom, nitrate, sulfate or phosphate radical, $m$ is the valency of the X ion and $n=m$.

The amount of the above-noted polyepoxide and acid to be used in the reaction may vary over a wide range. In general, these reactants are used in approximately chemical equivalent amounts. As used herein and in the appended claims a chemical equivalent amount of the polyepoxide refers to that amount needed to furnish one epoxy group per carboxyl group. Excess amounts of either reactant can be used. Preferred amounts range from about 0.5 to 2 equivalents of carboxylic acid per equivalent of epoxide.

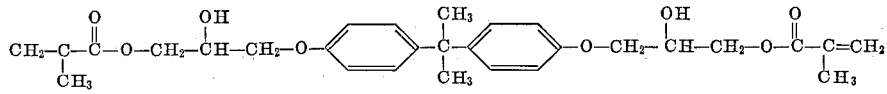

The amount of the catalyst employed may also vary over a considerable range. In general, the amount of the catalyst will vary from about 0.01% to about 3% by weight, and more preferably from 0.3% to 2% by weight of the reactants.

The reaction may be conducted in the presence or absence of solvents or diluents. In most cases, the reactants will be liquid and the reaction may be easily effected without the addition of solvents or diluents. However, in some cases, whether either or both reactants are solids or viscous liquids it may be desirable to add diluents to assist in effecting the reaction. Examples of such materials include the inert liquids, such as inert hydrocarbons as xylene, toluene, cyclohexane and the like.

If solvents are employed in the reaction and the resulting product is to be used for coating purposes, the solvent may be retained in the reaction mixture. Otherwise, the solvent can be removed by any suitable method such as by distillation and the like. If the product is not to be used for sometime after its formation, it may also be desirable to remove the catalyst used in the preparation, such as by stripping, neutralization and the like.

Temperatures employed in the reaction will generally vary from about 50° C. to about 150° C. In most cases, the reactants will combine in the presence of the new catalysts at a very rapid rate and lower temperatures will be satisfactory. Particularly preferred temperatures range from about 50° C. to 120° C.

The reaction will be preferably conducted under atmospheric pressure, but it may be advantageous in some cases to employ subatmospheric or superatmospheric pressures.

The course of the reaction may be conveniently followed by determination of the acidity. The reaction is considered to be substantially complete when the acidity has been reduced to about 0.015 eq/100 grams or below.

The process of the invention may be effected in any suitable manner. The preferred method merely comprises adding the polyepoxide, acid, catalyst, and solvent or diluent if desired, in any order and then applying the necessary heat to bring about the reaction. The reaction mixture may then be distilled or stripped to remove any of the unnecessary components, such as solvent, catalyst, excess reactants and the like.

The polyester products obtained by the above process will vary from liquids to solid resins. The products will possess a plurality of free OH groups and a plurality of ethylenic groups. The products will be of higher molecular weight than the basic polyepoxide from which they are formed and will possess at least more than one ester group per polyepoxide unit.

A very preferred polyester is obtained by reacting a glycidyl polyether of 2,2-bis(4-hydroxyphenyl)propane with methacrylic acid and has the following formula:

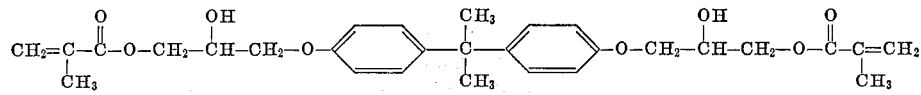

The preparation and properties of some of the above-noted unsaturated polyesters are illustrated below:

Polyester A 68.8 parts of the diglycidyl ether of 2,2-bis(4-hydroxyphenyl)propane were combined with 31.2 parts of glacial methacrylic acid and 0.43 part of tetramethylammonium chloride and the mixture heated at 115° C. for 1 hour and 15 minutes. During that time, the acidity changed from 0.362 eq./100 grams to about 0.017 eq./100 grams indicating there was substantially complete reaction. The resulting product was an acetone soluble viscous liquid polyester identified as having the following structure:

Polyester B 468 parts of a glycidyl polyether of 2,2-bis(4-hydroxyphenyl)propane having a molecular weight of about 350 and an epoxy value of 0.50 eq./100 grams were combined with 203 parts of glacial methacrylic acid and .5% benzyltrimethylammonium chloride and the mixture heated at 115° C. for about 1 hour and 30 minutes. During that time, the acidity changed from .311 to .004. The resulting product was an acetone-soluble thick unsaturated polyester having the following analysis: epoxy value 0.008 eq./100 grams, hydroxy value 0.39 eq./100 grams, acidity 0.004 eq./100 grams and ester value 0.282 eq./100 grams.

Polyester C 350 parts of a glycidyl polyether of 2,2-bis(4-hydroxyphenyl)propane having a molecular weight of 1060 and an epoxy value of 0.154 eq./100 grams was combined with 70.5 parts of glacial methacrylic acid and .5% of tetramethylammonium chloride. This mixture was heated at 100° C. for 3¾ hours. The resulting product was acetone-soluble solid polyester having the following analysis: ester value 0.125 eq./100 grams, hydroxy value 0.39 eq./100 grams, molecular weight 1270, acid value 0.009 eq./100 grams and epoxy value 0.012 eq./100 grams.

Polyester D 465 parts of a glycidyl polyether of brominated 2,2-bis(4-hydroxyphenyl)propane was combined with 107.5 parts of glacial methacrylic acid and .5% of tetramethylammonum chloride. This mixture was heated to 110° C. The acidity dropped from 0.217 to 0.002 eq./100 grams in about 1¾ hours. The resulting product was a liquid acetone-soluble polyester.

Polyester E 100 parts of a glycidyl ether of a phenol-formaldehyde condensate having a molecular weight of 650 and an epoxy value of 0.558 eq./100 grams were combined with 48 parts of glacial methacrylic acid and 1.08 parts of tetramethylammonium chloride and 0.44 part hydroquinone inhibitor and the mixture heated at 100° C. for 4½ hours. The acidity dropped from 0.377 to 0.044. The resulting product was a viscous liquid soluble in acetone and benzene. Analysis: hydroxy value 0.47 eq./100 grams, ester value 0.399 eq./100 grams and acidity 0.004 eq./100 grams.

The half esters (or partial half esters) are then obtained.

The new modified polyesters of the present invention invention are obtained by reacting the above-described hydroxy-substituted unsaturated polyesters with a polycarboxylic acid anhydride. These anhydrides include, among others, maleic acid anhydride, chloromaleic acid anhydride, dichloromaleic acid anhydride, 1,2-cyclohexenedicarboxylic acid anhydride, vinylcyclohexane-dicarboxylic acid anhydride, phthalic anhydride, nadic anhydride, the tetrahalo-phthalic anhydrides such as tetrabromo- and tetrachloro-phthalic anhydride and the like, and mixtures thereof. The preferred anhydrides to be used are the ethylenically unsaturated polycarboxylic acid anhydrides containing from 4 to 18 carbon atoms.

The amount of the anhydride employed in the reaction should be sufficient to effect a formation of a half ester at each of the OH groups to be esterified. There should thus be approximately one mole of the anhydride for each OH on the polyester molecule to be esterified. In some cases, it may be desired to effect a 100% esterification of the free OH groups on the polyester molecule, while in other cases only partial esterification, such as from 5% to 60% of the OH groups. For many applications, such as in the formation of laminated products it is generally desirable to effect only a say 5%, 10%, 20% or 40% esterification of the OH groups. Thus, for a 50% esterification of the two OH groups present on Polyester A noted above with maleic anhydride, one would react one mole of the polyester with approximately one mole of the maleic anhydride.

The reaction between the polyester and the anhydride can be accomplished by meerly mixing and reacting the components together in a suitable reaction vessel in the absence of water. The reaction may be accomplished in the presence or absence of solvents or diluents. Suitable solvents include the inert hydrocarbons, such as cyclohexane, benzene, toluene and the like.

The reaction is accomplished in the absence of water and by using dry reactants and reaction vessels.

The reaction may be accomplished over a wide range of temperatures. In most cases, the reaction will take place at room temperature and is preferably conducted at or near room temperature. The reaction, however, can be speeded by the application of heat. In such a case, preferred temperatures range from about 25° C. to about 100° C.

The half ester modified products prepared by the above process will vary from thick liquids to solid product. They will possess a plurality of free carboxyl groups and increased unsaturation. For example, the maleic anhydride half ester of Polyester A (100% esterified) shown above will be tetrafunctional with respect to double bonds and contain two terminal carboxyl groups. The products will be soluble in solvents, such as benzene, acetone and the like and can be converted on application of heat and catalysts as noted below to hard insoluble, infusible products.

In case products of higher viscosity are needed, the partial half esters may be thickened by refluxing in an inert solvent while removing water formed as a result of the reaction of the free carboxyl groups with the remaining hydroxyl groups on the polyester.

Preferred partial esters have the following general formula:

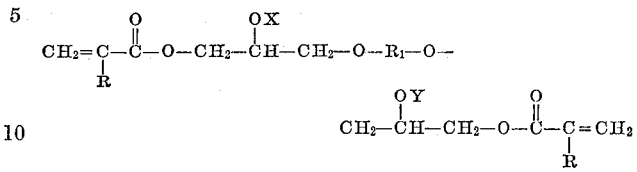

wherein R is hydrogen or an alkyl radical preferably from 1 to 5 carbon atoms, $R_1$ is a residue of a polyhydric phenol by removing the two OH groups and X and Y are each hydrogen or a

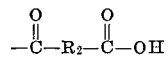

radical wherein $R_2$ is an unsaturated alkylene radical, preferably from 2 to 16 carbon atoms. Very preferred half esters comprise the partial half esters thereof, i.e., the preferred partial half esters comprise those half esters of the above formula wherein, on the average, the total of X+Y comprise from about 5% to 95% hydrogen atoms and from about 5% to 95%.

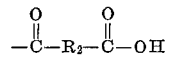

radicals. In other words, from 5% to 95% of the hydroxyl groups are esterified. As noted hereinbefore, however, for some applications, it may be desirable to effect a 100% esterification wherein X and Y are each

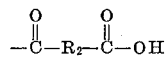

The new compositions of the present invention are prepared by mixing the above-described half esters with a glycidyl polyether of a polyhydric alcohol or a polyhydric phenol such as 2,2-bis(4-hydroxyphenyl)propane.

Suitable glycidyl polyethers of 2,2 - bis(4 - hydroxyphenyl)propane have an average molecular weight of from about 350 to about 5000 and an epoxide equivalent weight of from about 175 to about 2500. Preferred, however, are the so-called solid resins having an average molecular weight of from about 800 to about 5000 and an epoxide equivalent weight of from about 400 to about 2500.

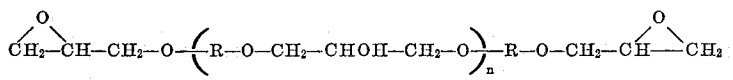

wherein $n$ is an integer of the series p, 1, 2, 3, and R represents the divalent radical

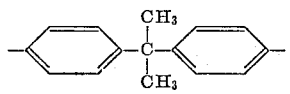

While for any single molecule, $n$ will be an integer, the fact that the polyether is a mixture of compounds causes the determined value of $n$, e.g., from molecule weight measurements, to be an average which is not necessarily zero or a whole number. It will be appreciated that the value of $n$ will be selected so that the final average molecular weight of the glycidyl polyether has the desired value.

Simply, the polyethers which are suitable for use in preparing the present condensates are prepared by heating 2,2-bis(4-hydroxyphenyl)propane (bisphenol A) with epichlorohydrin in a basic reaction medium. Depending upon the type (molecular weight range, etc.) of product desired, there is used from more than 1 to 2 or more moles of epichlorohydrin per mole of bisphenol. Also present is a base, such as sodium hydroxide, generally in an amount of from about 5% to 30% stoichiometric excess of the epichlorohydrin, i.e., 1.05 to 1.3 equivalents of base per mole of epichlorohydrin. In effecting the reaction, the bisphenol is mixed with an aqueous solution of the base and heated. The epichlorohydrin is then added rapidly to the stirred reaction mass. The initial reaction is somewhat exothermic so that a temperature rise occurs to some extent. After addition of the epichlorohydrin, heating is applied for several hours while stirring in order to complete the reaction. While still in the molten state, the formed polyether is washed with water until free of base, and then heated to remove the water.

The preparation of two suitable glycidyl polyethers of 2,2-bis(4-hydroxyphenyl)propane are illustrated below:

Polyether A.—About 2 moles of bisphenol A was dissolved in 10 moles of epichlorohydrin and 1 to 2% water added to the remaining mixture. The mixture was then brought to 80° C. and 4 moles of solid sodium hydroxide added in small portions over a period of about 1 hour. During the addition, the temperature of the mixture was held to about 90° C. to 110° C. After the sodium hydroxide had been added, the water formed in the reaction and most of the epichlorohydrin was distilled off. The residue that remained was combined with an approximately equal amount of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value of 0.50 eq./100 g., and an epoxy equivalent weight of about 185–195. For convenience, this product will be referred to hereinafter as Polyether A.

Polyether B.—Into a reaction vessel fitted with a stirrer, 1 mole of 2,2-bis(4-hydroxyphenyl)propane, referred to as bisphenol A, and 1.88 moles of sodium hydroxide as a 10% aqueous solution are introdued and heated to about 45° C. whereupon 1.47 moles of epichlorohydrin are added rapidly while agitating the mixture. The temperature is then adjusted so that the mixture is heated at about 100° C. to 105° C. for about 80 minutes. The mixture separates into a two-phase system and the aqueous layer is decanted. The product is then washed with hot water until neutral to litmus whereupon the resulting polyether is drained and dehydrated by heating at about 150° C.

The polyether has a softening point of about 71° C. (Durrans' Mercury Method). The molecular weight is 900 measured ebullioscopically in ethylene dichloride (average $n=2$), and the epoxide equivalent weight is from about 425 to 550, which is the grams of resin containing one gram-equivalent of epoxide.

It will be appreciated by those skilled in the art that higher (or lower) molecular weight epoxy resins can be made by similar processes by simply varying the ratios of the phenol and epichlorohydrin. Thus, other suitable epoxy resins are:

Polyether C.—An epichlorohydrin/bisphenol A-type solid epoxy resin having a melting point of about 75–85° C. (Durrans' Mercury Method), an epoxide equivalent weight of about 600 to 700 and an average molecular weight of about 1060.

Polyether D.—An epichlorohydrin/bisphenol A-type solid epoxy resin having a melting point of about 95 to 105° C. (Durrans' Mercury Method), an epoxide equivalent weight of about 875 to 1025 and an average molecular weight of about 1400.

Polyether E.—An epichlorohydrin/bisphenol A-type solid epoxy resin having a melting point of about 125 to 135° C. (Durrans' Mercury Method), an average molecular weight of about 2900 and an epoxide equivalent weight of from about 2000 to 2500.

Improved chemical resistance may also be obtained when the polymer additive is a solid linear polyether resin prepared by condensing a diepoxide such as the diglycidyl ether of 2,2-bis(4-hydroxyphenyl)propane with a dihydric phenol such as 2,2-bis(4-hydroxyphenyl)propane. Suitable such linear polyether resins and their preparation are described in U.S. 3,306,872.

The compositions of the present invention are prepared by mixing the half esters described above with an unsaturated monomer as described hereinafter and then adding to this mixture the glycidyl polyether of 2,2-bis(4-hydroxyphenyl)propane. The amount of glycidyl polyether added will vary depending upon the desired end properties such as viscosity. Preferably, the amount of the glycidyl polyether added will vary from about 0.1 to about 40 parts per 100 parts of half ester or its solution in one of the hereinafter described unsaturated monomers. More preferably, the amount of the glycidyl polyether polymer and in a weight ratio of 1:100 to 15:100.

The mixing can be accomplished over a wide range of temperatures. In most cases, the mixing would take place at room temperature and it is preferably conducted at or near room temperature. The mixing, however, can be accomplished advantageously at temperature ranges from 25° C. to 75° C., particularly if the polymer additive is solid or a thick liquid.

The mixing can be accomplished in the presence of solvents or diluents. In some cases, it is preferred to employ monomers and preferably those containing an ethylenic $>C=C<$ group generally used with unsaturated polyesters such as, for example, styrene, and substituted styrenes such as alpha-methyl styrene, t-butyl styrene and chloro-styrene, methyl methacrylate, butadiene, acrylonitrile, methacrylonitrile, diallyl phthalate, allyl propionate, isoprene, diallylmaleate, divinyl adipate, dichlorostyrene, ethylene glycol diacrylate alpha-methylstyrene, vinyl naphthalene, vinyl phenol, divinyl benzene, vinyl benzoate, triallyl cyanaurate, vinyl chloride, vinylidene chloride, propylene, isobutylene, methyl pentadiene, vinyl pyrrolidone, vinylpyridine, diethyl maleate, and the like. These are preferably used in amounts varying from about 1% to 70% by weight.

The compositions obtained by the above described process will be soluble in solvents such as benzene, acetone and the like and will possess ethylenically unsaturated bonds and can be cured in the presence of peroxides to form insoluble, infusible products.

The compositions formed by the above process can be cured by heating with peroxide catalysts (e.g., 1% to 10% by weight) to form valuable products. They may be utilized, for example, to form various types of coating and impregnating compositions or in making cast or molded plastic articles. The compositions are particularly suited for use in making laminated products as they have ability to adhere to the substrate and to be cured under conventional limited conditions to form hard heat resistance products having good chemical resistance.

As hereinbefore noted, the compositions are specifically suited for preparing glass laminated products since they impart outstanding resistance to NaOH and other chemical solutions heretofore unobtainable by these polyesters.

In making the laminates one may apply as by dipping, painting, spraying or padding the desired prepolymer composition or solution onto the resulting product to the desired pressure and temperature to effect a cure. The material treated in this manner may be regular sheets of cloth, paper, mat or wood and the like, or may be strands or fibers which may be alternately woven or wound into the desired composite structure. The new compositions are particularly suited for use in the filament winding technique in that they can be easily applied to the glass strands and treated material wound on the mandrel to form the desired laminated product. The products are then subjected to conventional pressures and temperatures for curing, e.g., 20° C. to 300° C. and pressure 15 p.s.i. to 2000 p.s.i.

To illustrate the manner in which the invention may be carried out the following examples are given. It is to be understood, however, that the examples are for the purpose of illustration and that the invention is not to be regarded as limited to any of the specific conditions or reactants recited herein. Unless otherwise specified, parts described in the examples are parts by weight.

EXAMPLE I

This example illustrates the preparation of a modified unsaturated polyester wherein about 10% of the available OH groups are esterified with a maleic anhydride. This example further illustrates the superior chemical resistance of the glass laminates prepared using these modified polyesters containing an epoxy compound.

2000 parts by weight of Polyester A prepared as noted hereinbefore is combined with 66.6 parts by weight of maleic anhydride and the combined mixture heated for 1 hour at 100° C. On cooling, the resulting product is a liquid polyester having an acidity of 0.040 eq./100 grams. The product is soluble in acetone, xylene and styrene and will be referred herein as Polyester N.

185 parts of the maleic acid anhydride half ester produced above (Polyester N) was combined with 185 parts by weight of styrene. 50 parts of this mixture and 1 part of $SiO_2$ (Cab-O-Sil) solution were combined with 0.5 part of a 60% solution of methyl ethyl ketone peroxide in dimethyl phthalate, 0.05 part dimethylaniline and 0.5 part cobalt naphthenate (6% w. cobalt).

Chopped mat reinforced laminates and glass cloth reinforced laminates were then prepared and their chemical resistance tested.

Chopped mat reinforced laminates were prepared from this modified polyester-styrene mixture in accordance with ASTM C581–65T and consisted of two layers of 1½ oz./sq. ft. Owens-Corning M901 mat faced on either side with a layer of veil mat, Owens-Corning M514 (10 mil). The laminates were allowed to gel at room temperature and were then post-cured for 8 hours at 50° C. The laminates exposed measured 4" x 5" and contained 75±2% by weight resin prior to exposure.

Glass cloth laminates were prepared from 181 Volan A fabric (14 plies) laid up parallel and nested and the resins were catalyzed with 2 parts per one hundred parts by weight of resin (phr.) of Luperco ATC (50% w. benzoyl peroxide in tricresyl phosphate). Laminates were cured in a press to stops for 30 minutes at 90° C. plus 1 hour at 115° C. and then post-cured 2 hours at 135° C. These laminates contained 30–35% by weight of resin.

The above procedure was substantially repeated wherein 10 parts by weight of the maleic anhydride-modified polyester is replaced with a glycidyl polyether of 2,2-bis(4-hydroxyphenyl)propane (Polyether E described hereinbefore).

For convenience, the above resin formulations will be referred to herein as follows:

|  | Parts by weight | |
|---|---|---|
| Composition | Laminating resin X | Laminating resin Y |
| Polyester N | 50 | 40 |
| Styrene | 50 | 50 |
| $SiO_2$ | 2 | 2 |
| Polyether E | | 10 |

The physical properties of the respective laminates were determined and the laminates were exposed to various chemical solutions and the physical properties redetermined after various exposure periods.

The results are tabulated in Table I.

EXAMPLE II

The procedures of Example I were substantially repeated wherein glycidyl Polyether E is replaced with Polyether D and with a solid glycidyl polyether of 2,2-bis(4-hydroxyphenyl)propane having an epoxy value of 0.03 eq./100 g. and an average molecular weight of 3750. Related results are obtained in each instance.

EXAMPLE III

The procedures of Example I were substantially repeated wherein the unsaturated polyester is prepared by reacting Polyether A with acrylic acid. Related improved chemical resistance is obtained in the glass laminates.

EXAMPLE IV

The procedures of Example I were substantially repeated wherein the styrene is replaced with each of the following: vinyl toluene, vinyl acetate, N-vinyl pyrrolidone, allylidene diacetate, triallyl cyanurate, diethyl maleate, diethyl fumarate, fumaronitrile, butyl methacrylate, methyl methacrylate, alpha-methyl styrene, t-butyl styrene, chloro-styrene, divinyl benzene, acrylamide, vinyl 2-chloroethyl ether, acrylonitrile, and divinyl succinate. Related results are obtained.

EXAMPLE V

The procedures of Example I were substantially repeated wherein the ratio of unsaturated polyester of styrene is as follows: 90:5, 85:15, 60:40 and 25:75. Related results are obtained in each instance.

EXAMPLE VI

The procedures of Example I were substantially repeated wherein the laminating composition comprised (A) 35 parts by weight of unsaturated polyester (Polyether A/methacrylic acid), 15 parts by weight of Polyether E and 50 parts by weight of styrene or (B) 45 parts by weight of unsaturated polyester (Polyether A/methacrylic acid), 5 parts by weight of Polyether E and 50 parts by weight of styrene. In each instance improved chemical resistance is obtained.

TABLE I.—PERCENT RETENTION OF PHYSICAL PROPERTIES OF GLASS MAT LAMINATES AFTER EXPOSURE TO CHEMICALS

|  | Laminating resin X | | | | Laminating resin Y | | | |
|---|---|---|---|---|---|---|---|---|
|  | Flexural strength | Flexural modulus | Notched Izod impact | Barcol hardness | Flexural strength | Flexural modulus | Notched Izod impact | Barcol hardness |
| (Initial values) | (16,300) | (736,000) | (5.2) | (48) | (13,100) | (746,000) | (4.3) | (45) |
| 20% chromic acid, 120° F.: | | | | | | | | |
| 3 months | a 31 | a 12 | a 47 | a 0 | 87 | 102 | 86 | 76 |
| 6 months | | | | | 98 | 82 | 77 | 44 |
| 9 months | | | | | | | | |
| 12 months | 15 | 11 | 32 | 0 | 47 | 25 | 37 | 0 |
| 20% $NH_4OH$, 150° F.: | | | | | | | | |
| 3 months | 64 | 85 | 51 | 58 | 110 | 94 | 43 | 51 |
| 6 months | 56 | 91 | 38 | 56 | 91 | 86 | 28 | 62 |
| 9 months | | | | | | | | |
| 12 months | 60 | 80 | 96 | 52 | 88 | 96 | 26 | 58 |
| Fertilizer solution, b 120° F.: | | | | | | | | |
| 3 months | 95 | 105 | 77 | 75 | 113 | 133 | 102 | 98 |
| 6 months | 96 | 104 | 81 | 90 | 105 | 122 | 117 | 107 |
| 9 months | | | | | | | | |
| 12 months | 92 | 108 | 79 | 96 | 118 | 118 | 97 | 100 |

Footnotes appear at end of table on following page.

TABLE I—Continued

| | Laminating resin X | | | | Laminating resin Y | | | |
|---|---|---|---|---|---|---|---|---|
| | Flexural strength | Flexural modulus | Notched Izod impact | Barcol hardness | Flexural strength | Flexural modulus | Notched Izod impact | Barcol hardness |
| Super Shell gasoline, 100° F.: | | | | | | | | |
| 3 months | 87 | 99 | 95 | 94 | 115 | 103 | 101 | 100 |
| 6 months | 90 | 107 | 95 | 92 | 114 | 110 | 119 | 106 |
| 9 months | | | | | | | | |
| 12 months | 65 | 102 | 81 | 94 | 121 | 113 | 101 | 107 |
| Clorox, 210° F.: | | | | | | | | |
| 3 months | a 70 | a 86 | a 78 | a 62 | a 90 | a 81 | a 40 | a 89 |
| 6 months | | | | | | | | |
| 9 months | 87 | 91 | 54 | 52 | 89 | 77 | 22 | 56 |
| 12 months | | | | | | | | |
| Distilled water, 210° F.: | | | | | | | | |
| 3 months | a 74 | a 98 | a 70 | a 83 | a 99 | a 88 | a 55 | a 88 |
| 6 months | | | | | | | | |
| 9 months | 60 | 101 | 46 | 67 | 110 | 94 | 38 | 60 |
| 12 months | 80 | 100 | 40 | 83 | 99 | 95 | 39 | 82 |
| 15% HCl, 210° F.: | | | | | | | | |
| 3 months | c 62 | c 90 | c 52 | c 100 | a 91 | a 88 | a 78 | a 91 |
| 6 months | a 63 | a 90 | a 66 | 98 | | | | |
| 9 months | 57 | 95 | 57 | 71 | 79 | 86 | 59 | 76 |
| 12 months | 51 | 90 | 42 | 96 | 81 | 95 | 51 | 93 |
| 25% acetic acid, 210° F.: | | | | | | | | |
| 3 months | a 80 | a 96 | a 64 | a 73 | a 116 | a 91 | a 98 | a 71 |
| 6 months | | | | | | | | |
| 9 months | 89 | 93 | 44 | 64 | 96 | 92 | 64 | 67 |
| 12 months | 79 | 90 | 40 | 48 | 99 | 87 | 47 | 56 |
| 25% H2SO4, 210° F.: | | | | | | | | |
| 3 months | a 86 | a 108 | a 66 | a 94 | 96 | 113 | 66 | 84 |
| 6 months | | | | | 82 | 120 | 55 | 93 |
| 9 months | 75 | 100 | 43 | 90 | | | | |
| 12 months | 78 | 113 | 47 | 83 | 76 | 99 | 51 | 93 |
| 75% H2SO4, 180° F.: | | | | | | | | |
| 3 months | | | | | 131 | 119 | 122 | 104 |
| 6 months | 58 | 92 | 119 | 73 | 110 | 94 | 110 | 76 |
| 9 months | 93 | 98 | 104 | 83 | | | | |
| 12 months | 74 | 95 | 86 | 77 | 64 | 90 | 103 | 73 |
| 5% HNO3, 210° F.: | | | | | | | | |
| 3 months | a 54 | a 93 | a 63 | a 79 | 53 | 103 | 43 | 67 |
| 6 months | | | | | 60 | 104 | 25 | 71 |
| 9 months | 52 | 79 | 28 | 37 | | | | |
| 12 months | 48 | 72 | 25 | 42 | | | | |
| 5% NaOH, 150° F.: | | | | | | | | |
| 3 months | a 49 | a 75 | a 21 | a 31 | 79 | 96 | 16 | 44 |
| 6 months | 42 | 69 | 22 | 42 | 53 | 80 | 5 | 58 |
| 9 months | 33 | 78 | 7 | 35 | 52 | 72 | 6 | 44 |
| 12 months | 22 | 50 | 5 | 7 | 34 | 69 | 4 | 40 |
| 50% NaOH, 210° F.: | | | | | | | | |
| 3 months | a 60 | a 76 | a 66 | a 0 | 104 | 77 | 92 | 78 |
| 6 months | | | | | 83 | 63 | 79 | 71 |
| 9 months | 12 | 35 | 36 | 0 | | | | |
| 12 months | 24 | 25 | 35 | 0 | 71 | 41 | 69 | 0 | a 4 months data.
b Composition: NH4NO3–44.3%; Urea–35.4%; Water–20.3%
c 2 months data.

We claim as our invention:

1. A curable composition which imparts improved chemical resistance to glass laminates comprising a mixture of
   (1) 100 parts by weight of a half ester prepared by reacting
       (a) a hydroxy-substituted ethylenically unsaturated polyester prepared by reacting a polyepoxide and an ethylenically unsaturated organic monocarboxylic acid in amounts to provide from about 0.5 to 2.0 carboxyl groups per epoxy group, and
       (b) a dicarboxylic acid anhydride containing from 4 to 18 carbon atoms, said anhydride being present in an amount to esterify from 5 to 100% of the hydroxyl groups of reaction product (a);
   (2) from 0.1 to 40 part by weight of a polymer additive consisting essentially of an unesterified glycidyl polyether of a polyhydric phenol or a polyhydric alcohol; and
   (3) from about 1 to about 200 parts by weight of a dissimilar ethylenically unsaturated monomer.

2. A composition as in claim 1 wherein the unsaturated polyester is the reaction product of a glycidyl polyether of 2,2-bis(4-hydroxyphenyl)propane and acrylic or methacrylic acid.

3. A composition as in claim 1 wherein the polymer additive is a glycidyl polyether of 2,2-bis(4-hydroxyphenyl)propane having an average molecular weight of from about 800 to about 5000.

4. A composition as in claim 1 wherein the dissimilar ethylenically unsaturated monomer is styrene.

5. A curable composition which imparts improved chemical resistance to glass laminates comprising
   (1) 100 parts by weight of a partial ester of the general formula

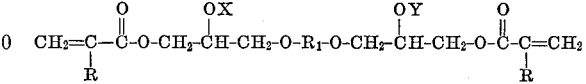

wherein R is hydrogen or alkyl, $R_1$ is the residue of a polyhydric phenol by removing two OH groups and X and Y are each hydrogen or a

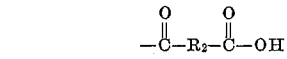

radical wherein $R_2$ is an unsaturated alkylene radical,
   (2) from 1 to 30 parts of an additive consisting essentially of an unesterified glycidyl polyether of 2,2-bis(4-hydroxyphenyl)propane having an average molecular weight of from about 800 to about 5000, and
   (3) from about 10 to about 150 parts by weight of styrene.

6. A composition as in claim 5 wherein the glycidyl polyether has an average molecular weight of about 2900.

7. A composition as in claim 1 wherein the dicarboxylic acid anhydride is maleic anhydride.

References Cited

UNITED STATES PATENTS

| 3,293,322 | 12/1966 | Pennino | 260—837 |
| 3,301,743 | 1/1967 | Fekete | 260—836 |
| 3,317,465 | 3/1967 | Doyle | 260—836 |
| 3,377,406 | 4/1968 | Newey | 260—837 |
| 3,420,914 | 1/1969 | May | 260—837 |
| 3,466,259 | 9/1969 | Jernigan | 260—837 |

PAUL LIEBERMAN, Primary Examiner

U.S. Cl. X.R.

161—184, 185; 260—37 Ep, 47 Ep, 78.4 Ep, 836